(No Model.)

H. B. SHERIDAN.
DYNAMO ELECTRIC MACHINE.

No. 256,392. Patented Apr. 11, 1882.

WITNESSES:
C. Neveux
B. G. Underwood.

INVENTOR:
H. B. Sheridan.
BY Munn & Co.
ATTORNEYS.

UNITED STATES PATENT OFFICE.

HENRY B. SHERIDAN, OF CLEVELAND, OHIO.

DYNAMO-ELECTRIC MACHINE.

SPECIFICATION forming part of Letters Patent No. 256,392, dated April 11, 1882.

Application filed August 22, 1881. (No model.)

*To all whom it may concern:*

Be it known that I, HENRY B. SHERIDAN, of Cleveland, in the county of Cuyahoga and State of Ohio, have invented a new and useful Improvement in Dynamo-Electric Machines, of which the following is a specification.

Figure 1:
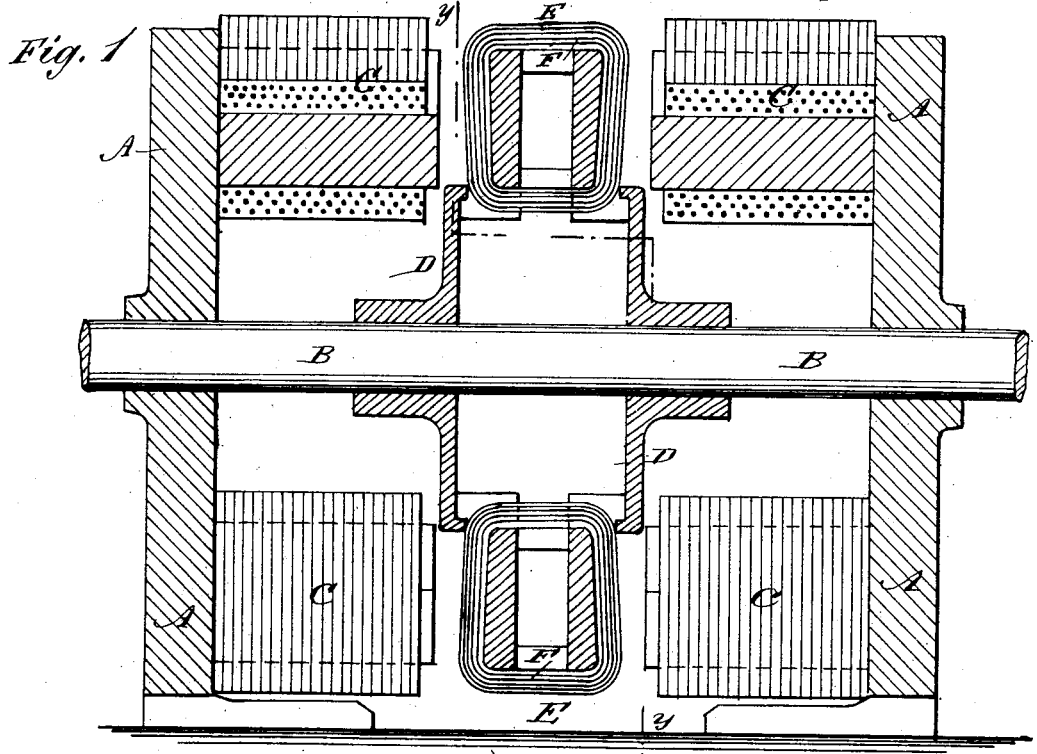
Figure 2:
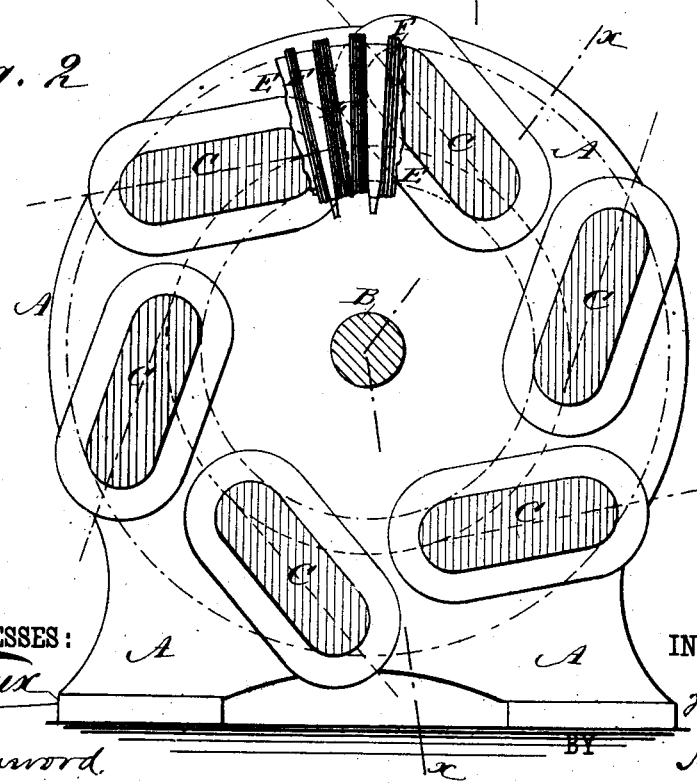

Figure 1 is a sectional side elevation of my improvement, taken through the line $xx$, Fig. 2. Fig. 2 is a sectional end elevation of the same, taken through the line $yy$, Fig. 1.

Reference is to be had to the accompanying drawings, forming part of this specification, in which similar letters of reference indicate corresponding parts in all the figures.

The object of this invention is to produce dynamo-electric machines so constructed that the current induced in the armature will be without wide breaks and nearly continuous.

The invention consists in a dynamo-electric machine constructed with its field-magnets made oblong in cross-section and arranged in two series in a circle around the armature-shaft, with the poles of the opposing series facing each other and arranged a sufficient distance apart to receive the armature between them, the poles of each series nearly overlapping each other laterally, forming a nearly-continuous magnetic field.

In the centers of the side frames, A, are formed bearings for the armature-shaft B.

To the frames A are attached series of magnets C, arranged in circles around the shaft B, one series being attached to each frame.

To the armature-shaft B, midway between the frames A, is attached a hub, D, carrying a ring-armature, E, which is wound in sections with coils F, one entire coil and parts of two adjacent coils being shown in Fig. 2.

The magnets C are made oblong in cross-section, and are arranged in inclined positions with reference to each other, so that they nearly overlap each other laterally, the side of one magnet being tangential to the rounded edge of the adjoining magnet, and so on throughout the series. With this arrangement the face of the pole of each magnet C is arranged diagonally across the path of the armature-ring in the plane of its rotation, as shown in Fig. 2. This construction brings the magnets C into such positions that each section-coil F of the armature E will pass upon the pole of each magnet C at the instant it leaves the pole of the preceding magnet, so that the current induced in the armature will be without wide breaks and will be nearly continuous. With this construction the armature E can be revolved in either direction.

Having thus fully described my invention, I claim as new and desire to secure by Letters Patent—

A dynamo-electric machine constructed substantially as herein shown and described, with its magnets C made oblong in cross-section and arranged around the armature-shaft B, with the side of each magnet in the series nearly overlapping the edge of the adjacent magnet, substantially as herein specified.

HENRY B. SHERIDAN.

Witnesses:
JAMES T. GRAHAM,
C. SEDGWICK.